Sept. 29, 1936.   G. W. CORDELL ET AL   2,055,573
COTTON GIN RIB
Original Filed Jan. 8, 1935

Inventors
G. W. Cordell
J. F. Cordell
By *Clarence A. O'Brien*
Attorney

Patented Sept. 29, 1936

2,055,573

UNITED STATES PATENT OFFICE 2,055,573

COTTON GIN RIB

George W. Cordell and Jesse F. Cordell, Magic City, Tex.

Application January 8, 1935, Serial No. 895
Renewed April 10, 1936

1 Claim. (Cl. 19—62)

This invention relates to an improved rib for cotton gins, the general object of the invention being to form an elongated longitudinal extending groove at each side of the lower end of the rib which will prevent damp cotton from choking the gin and to facilitate the passage of trash and faulty seed from between the lower ends of the ribs to the seed auger.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
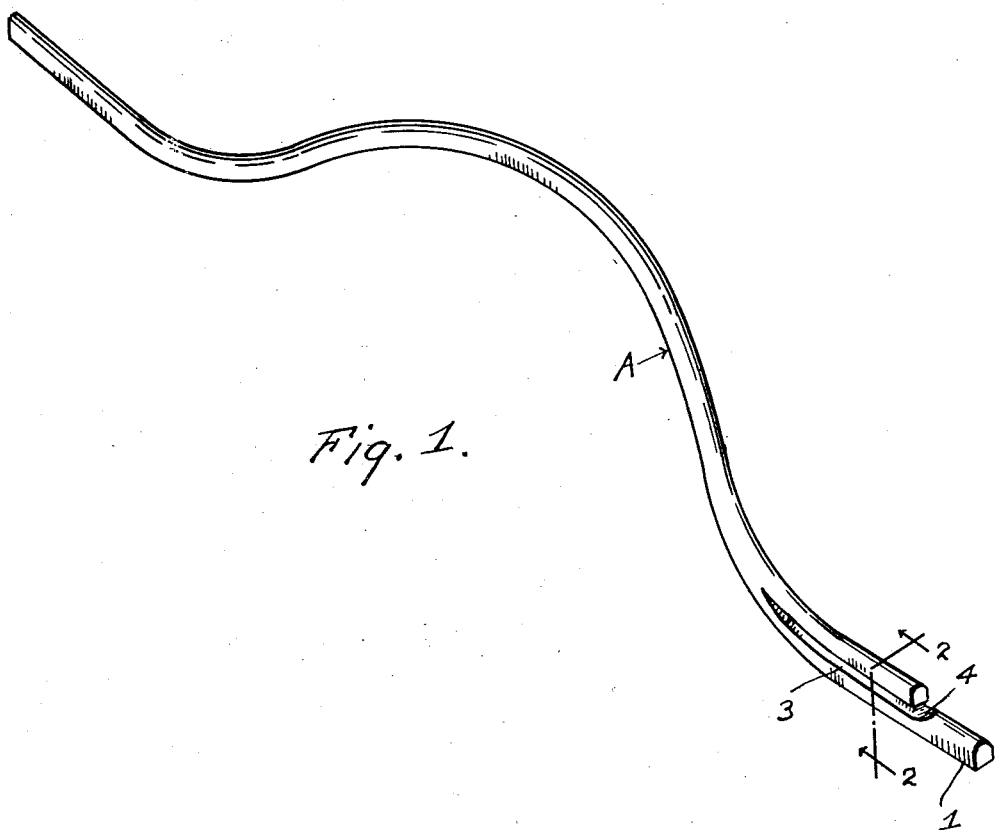
Fig. 1 is a perspective view of the invention.
Figure 2:
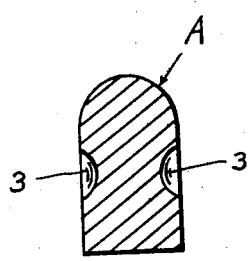
Fig. 2 is a section on line 2—2 of Fig. 1.

As shown in this drawing, the rib A is provided with the intermediate bowed part and substantially straight ends, with the lower end having its lower part extended as at 1 and this end portion is formed with the grooves 3 in its sides which are connected together at the end of the enlarged portion by a transverse groove 4 in the inner end of the part 1. With this improved rib, the cotton will collect in the groove where it will be reached by some of the saws so that the cotton is removed from the groove and is then picked up by the air blasts which will run the cotton through the gin in the usual manner. The improved rib is extended about one inch or one and one-quarter inches beyond the length of the ordinary rib and the grooves create a condition whereby cotton will be reached by the saws and thus not choke the gin by clogging at the end of the rib, particularly when the cotton is damp. These grooves also facilitate the passage of trash and faulty seed from between the ribs into the seed auger.

It is thought from the foregoing description that the advantages and novel features of the invention will be readily apparent.

It is to be understood that changes may be made in the construction and in the combination and arrangement of the several parts, provided that such changes fall within the scope of the appended claim.

We claim:

A cotton gin rib having one end provided with an extension which is of less thickness than said end and the sides of said end part having longitudinally extending grooves therein, connected together at the inner end of the extension and the groove in each side being spaced from the top and bottom edges of the rib.

GEORGE W. CORDELL.
JESSE F. CORDELL.